(12) United States Patent
Eshima et al.

(10) Patent No.: US 8,853,532 B2
(45) Date of Patent: Oct. 7, 2014

(54) CONDUCTING PATH

(75) Inventors: Hirotaka Eshima, Hitachi (JP); Fumihito Oka, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 13/200,922

(22) Filed: Oct. 5, 2011

(65) Prior Publication Data

US 2012/0186845 A1 Jul. 26, 2012

(30) Foreign Application Priority Data

Jan. 21, 2011 (JP) .................................. 2011-011017

(51) Int. Cl.
*H01B 7/42* (2006.01)
*H02G 3/03* (2006.01)

(52) U.S. Cl.
CPC ........................................ *H02G 3/03* (2013.01)
USPC ....................... 174/15.6; 174/113 R; 248/74.2

(58) Field of Classification Search
USPC .............. 174/113 R, 15.6, 28; 248/68.1, 74.2
See application file for complete search history.

(56) References Cited

U.S. PATENT DOCUMENTS

| 1,089,642 A * | 3/1914 | Honold .................... 174/70 R |
| 1,504,630 A * | 8/1924 | Lilleberg ................... 174/71 R |
| 2,218,830 A | 10/1940 | Rose et al. |
| 3,032,604 A | 5/1962 | Timmons |
| 3,328,510 A | 6/1967 | White |
| 3,461,218 A | 8/1969 | Buchhold |
| 3,800,062 A * | 3/1974 | Kataoka et al. .............. 174/15.5 |
| 4,176,238 A | 11/1979 | Vulis et al. |
| 4,374,299 A | 2/1983 | Kincaid |
| 5,073,126 A | 12/1991 | Kikuchi et al. |
| 5,230,488 A | 7/1993 | Condon |
| 6,943,300 B2 * | 9/2005 | Ekeberg et al. ........... 174/113 R |
| 7,094,973 B2 | 8/2006 | Ashibe et al. |
| 7,550,674 B2 * | 6/2009 | Jean ......................... 174/110 R |
| 8,033,512 B2 | 10/2011 | Lien |
| 2008/0090732 A1 | 4/2008 | Hirose |
| 2008/0312089 A1 | 12/2008 | Jang et al. |
| 2009/0016843 A1 | 1/2009 | Komsitsky et al. |

(Continued)

FOREIGN PATENT DOCUMENTS

| JP | 53-27477 | 3/1978 |
| JP | 63-314114 A | 12/1988 |

(Continued)

OTHER PUBLICATIONS

United States Office Action dated Nov. 21, 2012, in U.S. Appl. No. 13/137,200.

(Continued)

*Primary Examiner* — Chau N Nguyen
(74) *Attorney, Agent, or Firm* — McGinn IP Law Group, PLLC (57) ABSTRACT

A conducting path includes a plurality of cables, and a cable clamp for clamping the plurality of cables together. The cable clamp includes a single metal plate molded along a perimeter of the plurality of cables, an attachment flange formed by overlapping both ends of the metal plate, and a cable supporting member for supporting the plurality of cables between the cable supporting member and the metal plate. The cable supporting member includes a coolant passage formed therein for passing a coolant to cool the plurality of cables in a longitudinal direction of the plurality of cables.

19 Claims, 4 Drawing Sheets

(56) References Cited

U.S. PATENT DOCUMENTS

| | | |
|---|---|---|
| 2009/0140108 A1 | 6/2009 | Faied |
| 2009/0294149 A1 | 12/2009 | Watanabe et al. |
| 2012/0112014 A1* | 5/2012 | Eshima et al. ............... 248/68.1 |
| 2012/0186845 A1* | 7/2012 | Eshima et al. ............... 174/15.6 |

FOREIGN PATENT DOCUMENTS

| | | |
|---|---|---|
| JP | 06-233437 A | 8/1994 |
| JP | 2000-133058 A | 5/2000 |
| JP | 2001-202837 A | 7/2001 |
| JP | 2009-138939 A | 6/2009 |
| JP | 2012-100467 A | 5/2012 |

OTHER PUBLICATIONS

United States Office Action dated Nov. 7, 2012, in U.S. Appl. No. 13/067,244.
Office Action dated Dec. 12, 2012 in U.S. Appl. No. 13/067,242.
Office Action dated Apr. 11, 2013 in U.S. Appl. No. 13/067,244.
Office Action dated May 23, 2013 in U.S. Appl. No. 13/067,242.
Non-Final Office Action dated Sep. 17, 2013 in U.S. Appl. No. 13/067,242.
Japanese Office Action dated Feb. 18, 2014 with an English translation.
Office Action dated Apr. 16, 2013 in U.S. Appl. No. 13/137,200.

* cited by examiner

FIG. 1A

1 CONDUCTING PATH
2a-2c CABLE
3 METAL PLATE
4 ATTACHMENT FLANGE
5 CABLE SUPPORTING MEMBER
5b COOLANT PASSAGE
10 CABLE CLAMP
11 IN-CABLE COOLANT PASSAGE

| 2a-2c CABLE |
| 3 METAL PLATE |
| 5b COOLANT PASSAGE |
| 9 COOLANT TUBE |
| 10 CABLE CLAMP |

FIG.4A

41 CONDUCTING PATH
33 CABLE SUPPORTING MEMBER
33c COOLANT PASSAGE

CONDUCTING PATH

The present application is based on Japanese patent application No. 2011-011017 filed on Jan. 21, 2011, the entire contents of which are incorporated herein by reference.

BACKGROUND OF THE INVENTION

1. Field of the Invention

This invention relates to a conducting path (i.e., electrically-conducting path) comprised of plural cables, and a cable clamp for clamping the plural cables together.

2. Description of the Related Art

Numerous types of cables (conducting paths) having a cooling function have been invented in the past (See JP-A-2000-133058 and JP-A-2001-202837, for example).

Among others, a conducting path for feeding power to an in-wheel motor (i.e. a motor being accommodated in a wheel of a vehicle) has been increasingly researched and developed in recent years.

SUMMARY OF THE INVENTION

The inventors have considered that a cooling function is added to the feeding conducting path which is connected to the in-wheel motor.

It is because the addition of the cooling function to the electrically conductive feed path which is connected to the in-wheel motor has the significant merit of being able to not only cool heat caused in each cable constituting the electrically conductive feed path, but also cool heat caused in the in-wheel motor and transferred to each cable, thereby allowing efficient dissipation of the heat caused in the in-wheel motor.

Also, the inventors have invented a new cable clamp as disclosed in Japanese patent application No. 2010-247413 (published as JP 2012-100467 A). That invention is characterized by a cable supporting member in the cable clamp.

The inventors have found first that an inner side of the cable supporting member is a dead space, and have ensured effective utilization of that dead space.

Also, in the past, in the cable clamp for clamping a plurality of cables together, the cables have been unable to be cooled in their fixed portion, to which the cable clamp has been attached, without a means of a coolant passage provided in the center of each cable as configured in JP-A-2001-202837 listed above. That is, in the prior art, the attempt to cool the cables in their fixed portion to which the cable clamp has been attached has required the means of the coolant passage provided in the center of each cable as configured in JP-A-2001-202837. This has been the constraint on the conducting path design.

It is an object of the present invention to provide a conducting path that ensures effective utilization of a dead space in an inner side of a cable supporting member associated with a cable clamp.

(1) According to one embodiment of the invention, a conducting path comprises:

a plurality of cables; and a cable clamp for clamping the plurality of cables together, the cable clamp comprising:

a single metal plate formed along a perimeter of the plurality of cables;

an attachment flange formed by overlapping both ends of the metal plate; and a cable supporting member for supporting the plurality of cables between the cable supporting member and the metal plate, wherein the cable supporting member comprises a coolant passage formed therein for passing a coolant to cool the plurality of cables in a longitudinal direction of the plurality of cables.

In the above embodiment (1) of the invention, the following modifications and changes can be made.

(i) The plurality of cables comprise three cables arranged in a triangular shape in a cross sectional view thereof, the metal plate is formed along a perimeter of the three cables, the cable supporting member is formed to contact all of the three cables, and support the three cables between the cable supporting member and the metal plate, and the coolant passage is formed at a central part of the cable supporting member.

(ii) The cable supporting member is inserted between two of the three cables arranged in a horizontal direction in the cross sectional view, perpendicularly to the horizontal direction and to the longitudinal direction of the two of the three cables arranged in the horizontal direction, and the cable supporting member is formed to reduce in width toward a forward end in a direction of being inserted between the two of the three cables arranged in the horizontal direction so as to facilitate the insertion.

(iii) The plurality of the three cables each comprise an in-cable coolant passage at a center part thereof in the longitudinal direction of the plurality of cables for passing the coolant.

Points of the Invention

According to one embodiment of the invention, a conducting path is constructed such that a cable supporting member for supporting plural cables enclosed in the path is provided with a coolant passage for passing a coolant to cool the plural cables in the longitudinal direction of the plural cables. Thus, a dead space inside of the cable supporting member can be effectively utilized, and the cables can be efficiently cooled at a fixed portion to which a cable clamp of the conducting path is attached.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Below are described preferred embodiments according to the invention, in conjunction with the accompanying drawings.

First Embodiment

Conducting Path 1

Figure 1A:
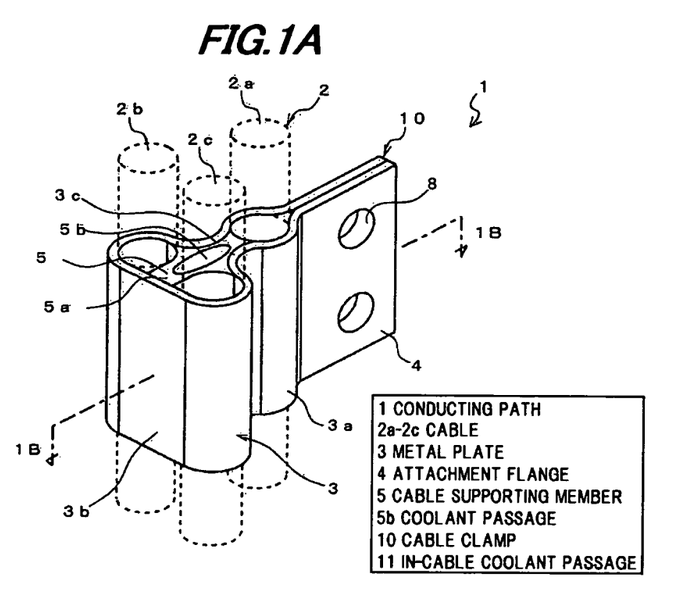
FIGS. 1A and 1B are a perspective view and a cross sectional view along line 1B-1B thereof, respectively, showing a conducting path in a first embodiment according to the invention.
Figure 1B:
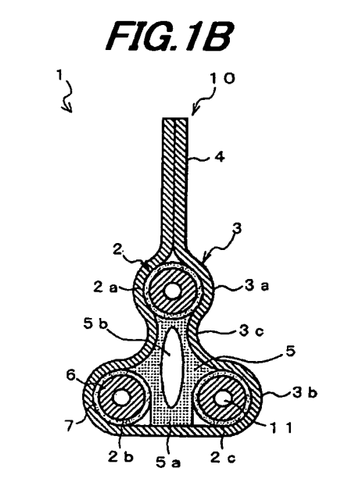
Figure 1C:
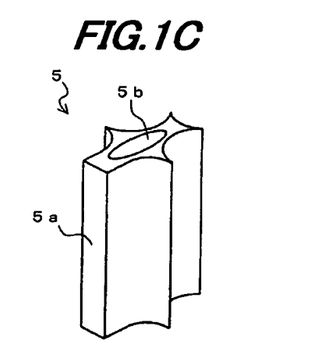
FIG. 1C is a perspective view showing a cable supporting member in the conducting path shown in FIGS. 1A and 1B.

FIGS. 1A and 1B are a perspective view and a cross sectional view along line 1B-1B thereof, respectively, showing a conducting path 1 in a first embodiment according to the invention, and FIG. 1C is a perspective view showing a cable supporting member 5 in the conducting path 1 shown in FIGS. 1A and 1B.

As shown in FIGS. 1A and 1B, the conducting path 1 includes a plurality of cables 2, and a cable clamp 10 for clamping the plural cables 2 together. Although in this embodiment it is described that the three cables 2a, 2b, and 2c arranged in a triangular shape in the cross sectional view are used, the number and arrangement shape of the cables 2 are not limited thereto.

The cables 2 are for feeding electrical power to an in-wheel motor built in a wheel of a vehicle, and the cable clamp 10 is used for fixing to the vehicle body the three cables 2 which extend from the in-wheel motor. That is, the conducting path 1 is for feeding electrical power to the in-wheel motor.

Cable 2

Although herein are used the cables 2 each comprising a conductor 6 and an insulator 7 covering a perimeter of the conductor 6, the cables 2 are not limited thereto, but may be replaced with coaxial cables each including an outer shield conductor added in each cable 2. Herein, the three cables 2 used are described as having the same diameter.

In this embodiment, the center in the cross sectional view of each cable 2 is formed with an in-cable coolant passage 11, through which a coolant is to be passed, in a longitudinal direction of each cable 2. The in-cable coolant passage 11 of each cable 2 comprises a hollow portion of a tube, such as a rubber tube or the like, (or a metallic tube, such as an aluminum tube or the like). The conductor 6 of each cable 2 is configured as a stranded wire helically wrapped around the tube.

Cable Clamp 10

The cable clamp 10 includes a single metal plate 3 molded along a perimeter of the three cables 2 arranged in the triangular shape in the cross sectional view, an attachment flange 4 formed by both ends of the metal plate 3 overlapping each other, and a cable supporting member 5 for supporting the three cables 2 between it and the metal plate 3.

Metal Plate 3

The metal plate 3 is shaped into a belt, and includes the attachment flange 4 formed by overlapping both the ends of this belt shaped metal plate 3 into a laminate, a first clamping portion 3a formed at the base end of the attachment flange 4, and which clamps one cable (in FIG. 1B, one top cable) 2a of the three cables 2 arranged in the triangular shape in the cross sectional view, and a second clamping portion 3b formed on the opposite side of the first clamping portion 3a to the attachment flange 4, to clamp the remaining two cables (in FIG. 1B, two bottom cables) 2b and 2c.

The first clamping portion 3a is formed along a perimeter of the cable 2a into a substantially circular shape in the cross sectional view, while the second clamping portion 3b is formed along a perimeter of the cables 2b and 2c into a substantially elliptic shape in the cross sectional view (which is formed by two parallel straight lines and two circular arcs joining the respective ends of both the straight lines together). A waisted portion 3c is formed between both the clamping portions 3a and 3b, so that both the clamping portions 3a and 3b are smoothly joined together in the waisted portion 3c. Herein, a gap is formed between metal plate 3 portions on both sides forming the waisted portion 3c together, so that a space in which the cable 2a is clamped, and a space in which the cables 2b and 2c are clamped are communicated with each other, via that gap.

Attachment Flange 4

The attachment flange 4 is provided to extend from the first clamping portion 3a and opposite the second clamping portion 3b (in FIG. 1B, upward), in other words, to project outward from one vertex of the triangular shape in which the cables 2 are arranged. Incidentally, the position of the attachment flange 4 is not limited thereto, but the attachment flange 4 may be provided to, for example, extend downward (in FIG. 1B, downward) from the second clamping portion 3b, or may be appropriately altered in position according to attachment space shape to which the cable clamp 10 is to be attached.

The attachment flange 4 is formed with through holes 8 through which fixing bolts respectively (not shown) are to be passed. By the bolts being passed through those through holes 8 and fixed with nuts respectively to a structure (vehicle body or the like) to which the cable clamp 10 is to be attached, the cable clamp 10 is fixed thereto.

Cable Supporting Member 5

The cable supporting member 5 is inserted between the three cables 2a, 2b, and 2c, to support the three cables 2a, 2b, and 2c between it and the metal plate 3.

The cable supporting member 5 is formed to have substantially the same length as the width (i.e. the vertical length in FIG. 1A) of the metal plate 3, and its side surface to be contacted with the cables 2a, 2b, and 2c is formed into circular arc surfaces along perimeters of the cables 2a, 2b, and 2c, respectively. The cable supporting member 5 is formed to have such an appropriate size as to be able to securely fix the three cables 2a, 2b, and 2c between it and the metal plate 3, when the cable supporting member 5 is inserted between the three cables 2a, 2b, and 2c.

In this embodiment, the cable supporting member 5 is inserted between the two cables 2b and 2c arranged in the horizontal or lateral direction in the cross sectional view thereof, perpendicularly to the horizontal direction and to the longitudinal direction of the two cables 2b and 2c arranged in the horizontal direction. That is, the insertion direction of the cable supporting member 5 is that from the top to bottom in FIG. 1B. As mentioned above, because in this embodiment the three cables 2 having the same diameter are used, the two cables 2b and 2c arranged in the horizontal direction are the same in diameter.

The cable supporting member 5 is shaped to narrow at a forward end 5a (in FIG. 1C, left near end) in its insertion direction, to facilitate the insertion between the two cables 2b and 2c.

The narrow shaped forward end 5a of the cable supporting member 5 is formed to have substantially the same width (i.e. horizontal width in FIG. 1B) as the distance between the cables 2b and 2c, while a rear (i.e. rear in the insertion direction, or upper in FIG. 1B) portion of the cable supporting member 5 relative to the forward end 5a is formed to be shaped along respective perimeters of the three cables 2a, 2b, and 2c, and along an inner surface of the metal plate 3 (i.e. shaped to fill the space between the three cables 2a, 2b, and 2c).

Incidentally, although herein the forward end 5a of the cable supporting member 5 is shown as being formed to have the constant width, the forward end 5a of the cable supporting member 5 may be chamfered or rounded, or tapered in such a manner that its width is gradually small toward its tip in its insertion direction. This allows facilitating the insertion between the two cables 2b and 2c. It should be noted, however, that when the forward end 5a of the cable supporting member 5 is chamfered or rounded or tapered, it is desirable that its portion to be machined be formed to be lower than the respective center axes of the two cables 2b and 2c. This is because if that portion to be machined is formed to be higher than the respective center axes of the two cables 2b and 2c, the contact area between the cable supporting member 5 and the cables 2b and 2c is small, and the cables 2b and 2c may therefore be unable to be securely held.

When fixing the three cables 2a to 2c to the cable clamp 10, both ends of the metal plate 3, i.e. the attachment flange 4 is first opened. From between the opened ends (i.e. from the opened attachment flange 4) of the metal plate 3, the cables 2b and 2c are then fitted into the second clamping portion 3b, and subsequently the cable supporting member is inserted between the cables 2b and 2c. Further, the cable 2a is fitted into the first clamping portion 3a, while both the ends (i.e. attachment flange 4) of the metal plate 3 are being closed.

That is, the invention allows the cable supporting member 5 to be inserted thereinto, even after the two cables 2b and 2c have been disposed in predetermined positions respectively of the second clamping portion 3b of the metal plate 3. This procedure is possible when the cable supporting member 5 is shaped to narrow at its forward end 5a. If the cable supporting member 5 is not narrow shaped at its forward end 5a, the foregoing procedure cannot be employed, but the two cables 2b and 2c and the cable supporting member 5 configured separately from each other need to be first fitted together, and then disposed in the predetermined positions respectively of the second clamping portion 3b of the metal plate 3.

This requires both the ends of the metal plate 3 to be considerably (widely) opened, when the two cables 2b and 2c and the cable supporting member 5 fitted together are disposed in the second clamping portion 3b of the metal plate 3. In view of both the ends of the metal plate 3 being finally pulled toward each other and closed, there is the problem that the cables 2b and 2c consequently slip in the process of both the considerably opened ends of the metal plate 3 being pulled toward each other, and its workability therefore worsens. This problem is significant when the cable clamp 10 is disposed vertically as shown in FIG. 1A.

On the other hand, the invention allows the cable supporting member 5 to be inserted thereinto, even after the two cables 2b and 2c have been disposed in the predetermined positions respectively of the second clamping portion 3b of the metal plate 3. It is therefore possible to narrow the opening between both the ends of the metal plate 3. This consequently has the advantageous effect of facilitating the user's work. That is, it is possible to ensure the enhancement of the user's workability.

Returning to the procedure, when both the ends (i.e. attachment flange 4) of the metal plate 3 are closed, the metal plate 3 deforms in such a manner that the space in the second clamping portion 3b narrows, and the cables 2b and 2c and the cable supporting member 5 are therefore clamped by the second clamping portion 3b, and the cables 2b and 2c are securely fixed to the metal plate 3. Likewise, the cable 2a is clamped in the first clamping portion 3a, and securely fixed to the metal plate 3. Incidentally, by the bolts being passed through the through holes 8 respectively and fastened to the structure to which the cable clamp 10 is to be attached, the cable clamp 10 can be fixed thereto, while both the ends (i.e. attachment flange 4) of the metal plate 3 can be closed at the same time.

Now, in the conducting path 1 in this embodiment, the cable supporting member 5 is formed with a coolant passage 5b, through which a coolant to cool the cables 2a to 2c is to be passed, in the longitudinal direction of the cables 2a to 2c. The coolant passage 5b is formed in the center in the cross sectional view of the cable supporting member 5. Although in this embodiment the coolant passage 5b is formed into an elliptic shape in the cross sectional view, the shape of the coolant passage 5b is not limited thereto. For example, the coolant passage 5b may be formed into a cross sectional shape along a portion of each cable 2a, 2b, and 2c. In this case, the coolant passage 5b can, when the coolant is passed therethrough, have its increased area between the coolant and the three cables 2a to 2c thereopposite, i.e. its increased heat exchange area between the coolant and the three cables 2a to 2c, and therefore its enhanced cooling efficiency.

Figure 2A:
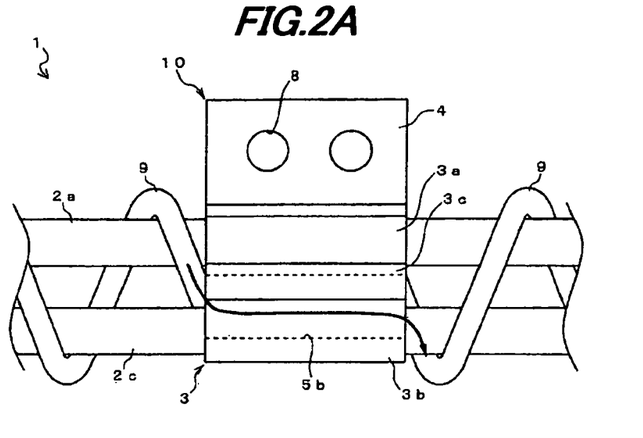
FIG. 2A is a side view showing the conducting path of FIG. 1A, in which a tube through which a coolant is to be passed is helically wound around cables.
Figure 2B:
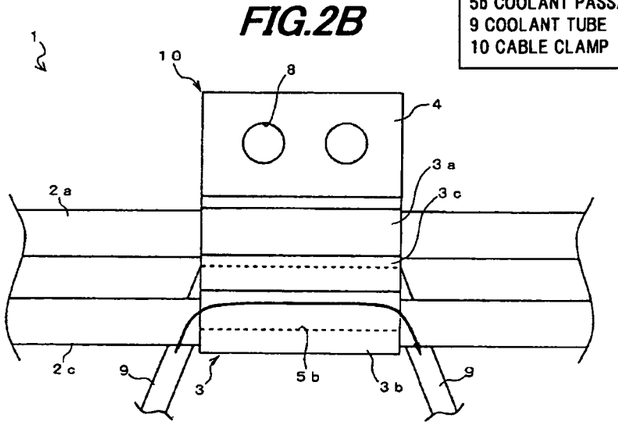
FIG. 2B is a side view showing the conducting path of FIG. 1A, in which the tube through which the coolant is to be passed is not wound around the cables, but connected directly to a coolant passage.

Referring to FIGS. 2A and 2B, the coolant passage 5b is connected with a tube 9 to feed the coolant. The tube 9 may, as in FIG. 2A, be helically wound around the three cables 2a to 2c, or, as in FIG. 2B, be not wound around the three cables 2a to 2c, but connected directly to the coolant passage 5b. As in FIG. 2A, helically winding the tube 9 around the three cables 2a to 2c allows cooling the three cables 2a to 2c in their entire longitudinal direction. Also, as in FIG. 2B, the tube 9 configured as being not wound around the three cables 2a to 2c but connected directly to the coolant passage 5b allows cooling only the fixed portion of the three cables 2a to 2c, to which the cable clamp 10 has been attached. Incidentally, although herein the tube 9 has been described as being connected to the coolant passage 5b, the tube 9 may be configured as being passed through the coolant passage 5b.

The tube 9 is configured to be connected to the in-cable coolant passage 11 of each cable 2a, 2b, and 2c at ends of each cable 2a, 2b, and 2c, so that the coolant is circulated through the respective in-cable coolant passages 11 of the cables 2a to 2c as forward paths and through the tube 9 as a backward path. Such configuration allows the cables 2a to 2c to be cooled by utilizing the backward path as well as the forward paths, and therefore makes it possible to suppress the rise in the temperature of the cables 2a to 2c. Also, it is possible to arrange the coolant circulating means (i.e. a coolant tank or a cooling system for cooling the coolant, a circulating pump and the like) together at one end of the cables 2a to 2c. Although herein the in-cable coolant passages 11 have been used as the forward paths and the tube 9 has been used as the backward path, the tube 9 may be used as the forward path and the in-cable coolant passages 11 may be used as the backward paths.

The coolant is not particularly limited, but may use cooling water, for example. It is desirable that the cable supporting member 5 use a high thermal conductivity material, and the cable supporting member 5 may appropriately be determined, taking account of heat resistance, chemical stability to the material to be used for the coolant, or the like. Specifically, there may be used the cable supporting member 5 formed of e.g. a metal, such as aluminum, SUS, copper or the like, or a resin, a rubber or the like. Further, the cable supporting member 5 may be configured so that the metal surface is coated with the rubber. Such configuration allows the cables 2a to 2c to be securely held between the cable supporting member 5 and the metal plate 3, and therefore makes it possible to enhance the cooling effect of the coolant. Incidentally, the foregoing cooling effect can be achieved by coating with the rubber only the metal surface portions to be contacted with the cables 2a to 2c respectively, even without coating the entire metal surface with the rubber.

Operation and Advantages

Operation and advantages of this embodiment are described.

In the conducting path 1 in this embodiment, the cable supporting member 5 has been formed with the coolant passage 5b, through which the coolant to cool the plural cables 2a to 2c is to be passed, in the longitudinal direction of the plural cables 2a to 2c.

Although the inner side of the cable supporting member 5 has conventionally been a dead space, the invention effectively utilizes this dead space, allowing the cables 2a to 2c to be cooled in their fixed portion to which the cable clamp 10 has been attached. Incidentally, although in this embodiment the in-cable coolant passage 11 has been provided in each cable 2a, 2b, and 2c, the in-cable coolant passage 11 may be not essential but omissible, and the invention can, even without the in-cable coolant passage 11 being provided in each cable 2a, 2b, and 2c, cool the fixed portion of the cables 2a to 2c, to which the cable clamp 10 has been attached.

Further, since in the conducting path 1, the cable supporting member 5 has been shaped to narrow at its forward end 5a in its insertion direction, the insertion of the cable supporting member 5 between the cables 2b and 2c is facilitated, and the fixation of the three cables 2a to 2c to the cable clamp 10 is thereby facilitated. Thus, it is possible to enhance the user's workability when routing the cables 2a to 2c.

Also, in the conducting path 1, the cable supporting member 5 has been inserted between the three cables 2a, 2b, and 2c, to support the three cables 2a, 2b, and 2c between it and the metal plate 3. The cables 2a, 2b, and 2c can therefore securely be fixed to the metal plate 3. Thus, even in the case of use on a vehicle, the occurrence of a positional slip of the cables 2a to 2c due to vibration can be suppressed in the fixed portion of the cables 2a to 2c, to which the cable clamp 10 has been attached.

Incidentally, the cables 2b and 2c are also considered as being clamped directly by the second clamping portion 3b, without using the cable supporting member 5. In this case, however, the cables 2b and 2c may excessively deform, and thereby break, or worsen in electrical properties.

Further, when the cables 2a to 2c are fixed by means of only the metal plate 3, the cables 2a to 2c are unlikely to be securely fixed thereto due to the metal plate 3 deformation caused by external force, or failure to machine the metal plate 3. In the conducting path 1 according to the invention, however, the cable clamp 10 allows the cables 2b and 2c to be more firmly fixed by means of the cable supporting member 5, and therefore held in shape, even in the event of the metal plate 3 deformation caused by external force, or failure to machine the metal plate 3. The cables 2a to 2c can therefore securely be fixed to the metal plate 3. Thus, it is possible to enhance the reliability of the conducting path 1.

Also, since the conducting path 1 has been configured to clamp the cables 2a to 2c between the cable supporting member 5 and the metal plate 3, no play occurs around the cables 2a to 2c. Thus, it is possible to securely fix and position the cables 2a to 2c.

Further, since in the conducting path 1, the metal plate 3 of the cable clamp 10 has been configured to be undivided, there is no need to assemble the cable clamp 10. It is therefore possible to enhance the user's workability in routing the cables 2a to 2c.

Further, since in the conducting path 1, the metal plate 3 of the cable clamp 10 has been molded along the perimeter of the three cables 2a to 2c arranged in the triangular shape in the cross sectional view, the size of the entire cable clamp 10 can be small, and the routing space in the cable clamp 10 portion can therefore be small. This contributes to space saving. Also, the cable supporting member 5 is not likely to rotate due to vibration. It is therefore possible to securely fix and position the cables 2b and 2c.

Modifications to the First Embodiment

Other embodiments according to the invention are described next.

Second Embodiment

Figure 3A:
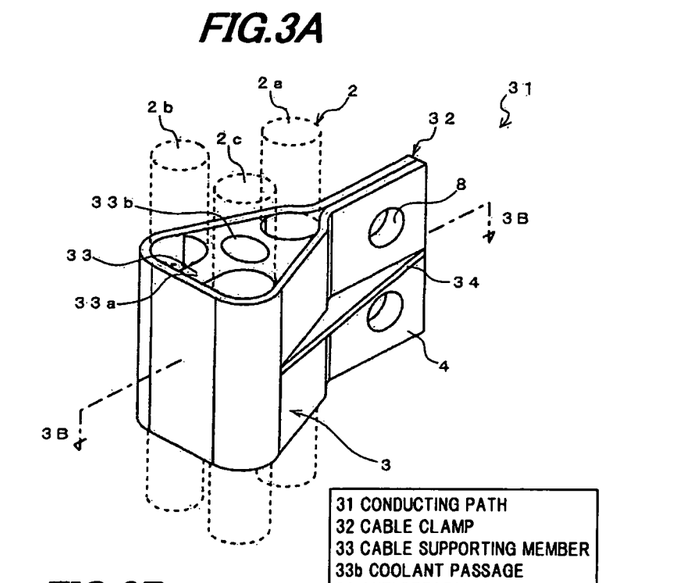
FIGS. 3A and 3B are a perspective view and a cross sectional view along line 3B-3B thereof, respectively, showing a conducting path in a second embodiment according to the invention.
Figure 3B:
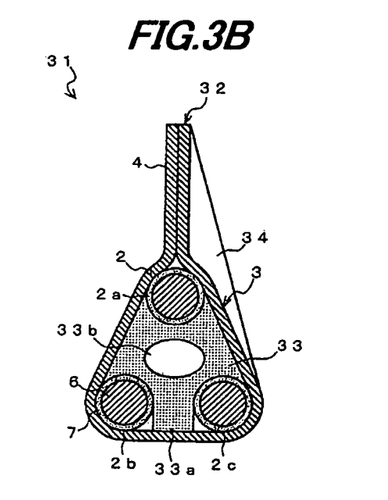
Figure 3C:
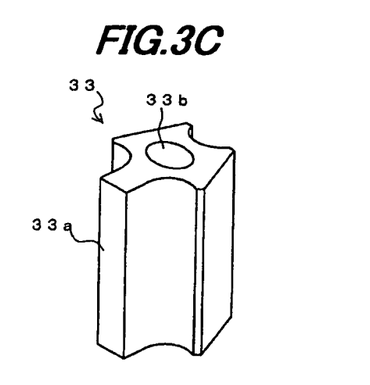
FIG. 3C is a perspective view showing a cable supporting member in the conducting path shown in FIGS. 3A and 3B.

Referring to FIGS. 3A to 3C, there is shown a conducting path 31. This conducting path 31 uses a cable clamp 32, in which its metal plate 3 as in the conducting path 1 shown in FIGS. 1A and 1B is formed in a triangular shape in a cross sectional view. Incidentally, in the conducting path 31, the in-cable coolant passage 11 of each cable 2a, 2b, and 2c is omitted, but the in-cable coolant passage 11 may be formed in each cable 2a, 2b, and 2c.

As with the previously described cable supporting member 5, a cable supporting member 33 to be used in the cable clamp 32 is shaped to narrow at its forward end 33a in its insertion direction, and the narrow shaped forward end 33a of the cable supporting member 33 is formed to have substantially the same width (i.e. horizontal width in FIG. 1B) as the distance between the cables 2b and 2c, while a rear (i.e. rear in the insertion direction, or upper in FIG. 3B) portion of the cable supporting member 33 relative to the forward end 33a is formed to be shaped along respective perimeters of the three cables 2a, 2b, and 2c, and along an inner surface of the metal plate 3. Also, the center in the cross sectional view of the cable supporting member 33 is formed with a coolant passage 33b, through which a coolant to cool the cables 2a to 2c is to be passed, in the longitudinal direction of the cables 2a to 2c.

Also, the conducting path 31 is formed with an anti-deformation rib 34, which extends from an opposite surface of the cable clamp 32 to an attachment surface of the attachment flange 4, in other words, from an attached bolt head side surface (in FIG. 3A, right near surface) of the cable clamp 32, to a metal plate 3 portion formed along a perimeter of the three cables 2a to 2c. The anti-deformation rib 34 serves to prevent the deformation of the attachment flange 4, and is formed to extend perpendicularly to the attachment flange 4. Incidentally, the previously described cable clamp 10 shown in FIGS. 1A and 1B may also be formed with the anti-deformation rib 34, in order to prevent the deformation of the attachment flange 4.

Third Embodiment

Figure 4A:
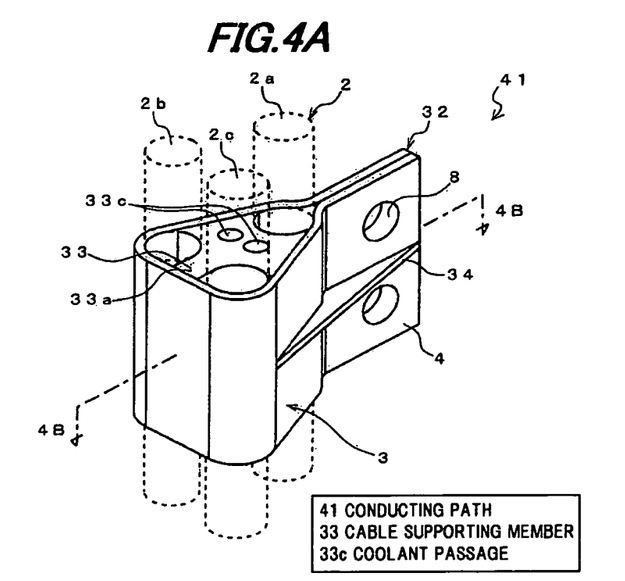
FIGS. 4A and 4B are a perspective view and a cross sectional view along line 4B-4B thereof, respectively, showing a conducting path in a third embodiment according to the invention.
Figure 4B:
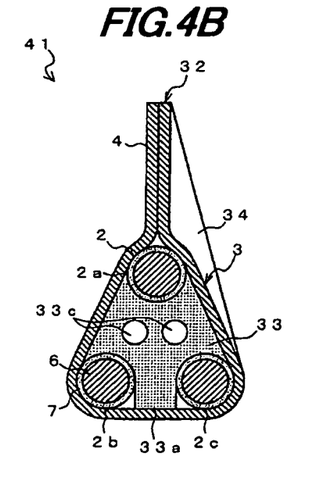
Figure 4C:
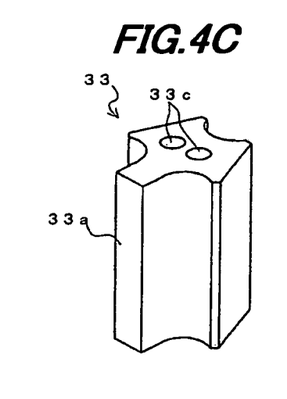
FIG. 4C is a perspective view showing a cable supporting member in the conducting path shown in FIGS. 4A and 4B.

Referring to FIGS. 4A to 4C, there is shown a conducting path 41. This conducting path 41 is formed with two coolant passages 33c in its cable supporting member 33 being equivalent to the cable supporting member 33 of the conducting path 31 shown in FIGS. 3A and 3B. The formation of the two coolant passages 33c allows the coolant to be circulated through one of the two coolant passages 33c as a forward path and through the other as a backward path, without the in-cable coolant passage 11 being formed in each cable 2a, 2b, and 2c. The cables 2a to 2c can therefore be cooled by the backward path as well as the forward path of the coolant, in their fixed portion to which the cable clamp 32 has been attached. Incidentally, instead of forming the two coolant passages 33c, the coolant passage 5b or 33b of the cable supporting member 5 or 33 used for the conducting path 1 or 31 shown in FIGS. 1A and 1B or 3A and 3B may be configured as being partitioned into two halves. This has a similar advantageous effect.

The invention is not limited to the above embodiments, but various alterations may be made without departing from the spirit and scope of the invention.

For example, although in the above embodiments, the conducting path 1, 31, or 41 has been described as being used as the conducting path for feeding power to an in-wheel motor, the use of the invention is not limited thereto.

Also, although in the above embodiments, the three cables 2a, 2b, and 2c used have been described as having the same diameter, the three cables 2a, 2b, and 2c used may differ in diameter. Also, the invention can naturally be applied even when using the two cables 2b and 2c different in diameter.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A conducting path, comprising:
   a plurality of cables; and
   a cable clamp for clamping the plurality of cables together, the cable clamp comprising:
      a single metal plate formed along a perimeter of the plurality of cables;
      an attachment flange formed by overlapping both ends of the metal plate; and
      a cable supporting member provided inside the metal plate for supporting the plurality of cables between the cable supporting member and the metal plate,
   wherein the cable supporting member comprises a coolant passage formed therein for passing a coolant to cool the plurality of cables in a longitudinal direction of the plurality of cables,
   wherein a tube for feeding the coolant is connected to the coolant passage or passes through the coolant passage, and
   wherein the cable supporting member is inserted between two of the cables arranged in a horizontal direction in a cross sectional view, perpendicularly to the horizontal direction.

2. The conducting path according to claim 1, wherein the plurality of cables comprise three cables arranged in a triangular shape in a cross sectional view thereof,
   wherein the metal plate is formed along a perimeter of the three cables,
   wherein the cable supporting member is formed to contact all of the three cables, and support the three cables between the cable supporting member and the metal plate, and
   wherein the coolant passage is formed at a central part of the cable supporting member.

3. The conducting path according to claim 2, wherein the three cables each comprise an in-cable coolant passage at a center part thereof in the longitudinal direction of the plurality of cables for passing the coolant.

4. The conducting path according to claim 3, wherein the tube is configured to be connected to the in-cable coolant passage of each cable at ends of each cable to circulate the coolant through one of the tube and the in-cable coolant passage as a forward path, and through another one of the tube and the in-cable coolant passage as a backward path.

5. The conducting path according to claim 1, wherein the cable supporting member is formed to reduce in width toward a forward end in a direction of being inserted between the two of the three cables arranged in a horizontal direction so as to facilitate an insertion of the cable supporting member.

6. The conducting path according to claim 5, wherein the three cables each comprise an in-cable coolant passage at a center part thereof in the longitudinal direction of the plurality of cables for passing the coolant.

7. The conducting path according to claim 6, wherein the tube is configured to be connected to the in-cable coolant passage of each cable at ends of each cable to circulate the coolant through one of the tube and the in-cable coolant passage as a forward path, and through another one of the tube and the in-cable coolant passage as a backward path.

8. The conducting path according to claim 1, wherein a width of the cable supporting member reduces toward an edge of the cable supporting member in a direction of an insertion of the cable supporting member between the two of the cables arranged in the horizontal direction.

9. The conducting path according to claim 8, wherein the width of the cable supporting member at the edge of the cable supporting member is the same as a distance, in the horizontal direction, between opposing peripheries of the two of the cables.

10. The conducting path according to claim 1, wherein a width of the cable supporting member reduces toward an edge of the cable supporting member in a direction of an insertion of the cable supporting member between the cables.

11. A conducting path, comprising:
    a plurality of cables; and
    a cable clamp for clamping the plurality of cables together, the cable clamp comprising:
       a single metal plate formed along a perimeter of the plurality of cables;
       an attachment flange formed by overlapping both ends of the metal plate; and
       a cable supporting member provided inside the metal plate for supporting the plurality of cables between the cable supporting member and the metal plate,
    wherein the cable supporting member comprises a coolant passage formed therein for passing a coolant to cool the plurality of cables in a longitudinal direction of the plurality of cables,
    wherein a tube for feeding the coolant is connected to the coolant passage or passes through the coolant passage, and
    wherein the plurality of cables each comprise an in-cable coolant passage at a center part thereof in the longitudinal direction of the plurality of cables for passing the coolant.

12. The conducting path according to claim 11, wherein the plurality of cables comprise an in-cable coolant passage at a center part thereof in the longitudinal direction of the plurality of cables for passing the coolant, and
    wherein the tube is configured to be connected to the in-cable coolant passage of each cable at ends of each cable to circulate the coolant through one of the tube and the in-cable coolant passage as a forward path, and through another one of the tube and the in-cable coolant passage as a backward path.

13. A conducting path, comprising:
    a plurality of cables; and
    a cable clamp for clamping the plurality of cables together, the cable clamp comprising:
       a single metal plate formed along a perimeter of the plurality of cables;
       an attachment flange formed by overlapping both ends of the metal plate; and
       a cable supporting member provided inside the metal plate for supporting the plurality of cables between the cable supporting member and the metal plate, wherein the cable supporting member comprises a coolant passage formed therein for passing a coolant to cool the plurality of cables in a longitudinal direction of the plurality of cables, wherein a tube for feeding the coolant is connected to the coolant passage or passes through the coolant passage, and wherein the tube is helically wound around the plurality of cables.

14. The conducting path according to claim 13, wherein the tube is helically wound around each of the plurality of cables.

15. The conducting path according to claim 13, wherein the tube is helically wound around the plurality of cables along an entire longitudinal length of the plurality of cables.

16. A conducting path, comprising:
a plurality of cables; and
a cable clamp for clamping the plurality of cables together, the cable clamp comprising:
   a single metal plate formed along a perimeter of the plurality of cables;
   an attachment flange formed by overlapping both ends of the metal plate; and
   a cable supporting member provided inside the metal plate for supporting the plurality of cables between the cable supporting member and the metal plate,
wherein the cable supporting member comprises a coolant passage formed therein for passing a coolant to cool the plurality of cables in a longitudinal direction of the plurality of cables,
wherein a tube for feeding the coolant is connected to the coolant passage or passes through the coolant passage, and
wherein the coolant comprises cooling water.

17. A conducting path, comprising:
a plurality of cables; and
a cable clamp for clamping the plurality of cables together, the cable clamp comprising:
   a single metal plate formed along a perimeter of the plurality of cables;
   an attachment flange formed by overlapping both ends of the metal plate; and
   a cable supporting member provided inside the metal plate for supporting the plurality of cables between the cable supporting member and the metal plate,
wherein the cable supporting member comprises a coolant passage formed therein for passing a coolant to cool the plurality of cables in a longitudinal direction of the plurality of cables,
wherein a tube for feeding the coolant is connected to the coolant passage or passes through the coolant passage, and
wherein each of the plurality of cables comprises:
   an in-cable coolant passage for passing the coolant; and
   a conductor comprising a stranded wire helically wrapped around the in-cable coolant passage.

18. A conducting path, comprising:
a plurality of cables; and
a cable clamp for clamping the plurality of cables together, the cable clamp comprising:
   a single metal plate formed along a perimeter of the plurality of cables;
   an attachment flange formed by overlapping both ends of the metal plate; and
   a cable supporting member provided inside the metal plate for supporting the plurality of cables between the cable supporting member and the metal plate,
wherein the cable supporting member comprises a coolant passage formed therein for passing a coolant to cool the plurality of cables in a longitudinal direction of the plurality of cables,
wherein a tube for feeding the coolant is connected to the coolant passage or passes through the coolant passage, and
wherein the coolant passage comprises a plurality of coolant passages for passing the coolant.

19. The conducting path according to claim 18, wherein one of the plurality of coolant passages circulates the coolant as a forward path and another one of the plurality of coolant passages circulates the coolant as a backward path.

* * * * *